United States Patent [19]

Gourley

[11] Patent Number: 4,552,951

[45] Date of Patent: Nov. 12, 1985

[54] DISPERSE AND ACID AZO DYES HAVING ONE OR TWO CINNAMOYL SUBSTITUENTS ON A PHENYL DIAZONIUM MOIETY AND CONTAINING AN ANILINE, TETRAHYDROQUINOLINE OR BENZOMORPHOLINE COUPLER

[75] Inventor: Robert N. Gourley, Formby, England

[73] Assignee: Eastman Kodak Company, Rochester, N.Y.

[21] Appl. No.: 573,243

[22] Filed: Jan. 23, 1984

[51] Int. Cl.$^4$ .................... C09B 29/01; C09B 29/085; C09B 29/36; C09B 29/44

[52] U.S. Cl. .................................. 534/770; 260/508; 534/588; 534/594; 534/728; 534/782; 534/787; 534/845; 534/847; 534/848; 534/849; 534/851; 534/854; 534/856; 534/859

[58] Field of Search ...................... 260/152, 155, 207.1, 260/205; 534/770, 728, 845, 847, 851, 854, 782, 787, 848, 849, 856, 859

[56] References Cited

U.S. PATENT DOCUMENTS

| | | | |
|---|---|---|---|
| 2,805,218 | 9/1957 | Towne et al. | 260/152 |
| 2,827,450 | 3/1958 | Towne et al. | 260/152 |
| 3,329,669 | 7/1967 | Sartori | 260/152 |
| 3,441,554 | 4/1969 | Hahn et al. | 260/152 |
| 4,101,543 | 7/1978 | Stiot et al. | 260/152 |
| 4,255,326 | 3/1981 | Giles et al. | 260/152 |
| 4,282,144 | 8/1981 | Weaver et al. | 260/152 |
| 4,400,318 | 8/1983 | Weaver et al. | 260/152 |
| 4,459,229 | 7/1984 | Weaver et al. | 260/152 |

FOREIGN PATENT DOCUMENTS

| | | | |
|---|---|---|---|
| 560334 | 7/1958 | Canada | 260/152 |
| 1351381 | 4/1974 | United Kingdom | 260/152 |
| 1351382 | 4/1974 | United Kingdom | 260/152 |
| 2041961 | 9/1980 | United Kingdom | 260/152 |

*Primary Examiner*—Floyd D. Higel
*Attorney, Agent, or Firm*—Donald W. Spurrell; Daniel B. Reece, III

[57] ABSTRACT

This invention relates to azo dyes which may be unsubstituted or substituted with a variety of groups known to the dye art, and containing a diazonium moieties from an aniline type compound and certain coupler moieties from aniline, tetrahydroquinoline, or benzomorpholine compounds, wherein the diazonium moiety has one or two cinnamoyl substituents, and wherein one or more water-solubilizing groups such as a sulfonic acid group or its metal or amine salt may be present as a substituent in the dye molecule for acid dyeing. These dyes are particularly useful in dyeing one or more of polyamide cellulose acetate polyester, wool and other fibers.

11 Claims, No Drawings

DISPERSE AND ACID AZO DYES HAVING ONE OR TWO CINNAMOYL SUBSTITUENTS ON A PHENYL DIAZONIUM MOIETY AND CONTAINING AN ANILINE, TETRAHYDROQUINOLINE OR BENZOMORPHOLINE COUPLER

This invention relates to azo dyes containing a diazonium moiety from an aniline type compound, and certain coupler moieties from aniline, tetrahydroquinoline, and benzomorpholine type compounds, wherein the diazonium moiety has one or two cinnamoyl groups, and wherein a wide variety of groups, e.g., one or more water-solubilizing substituents such as sulfonic acid groups or their metal or amine salts may be present in the dye molecule. These dyes are useful for dyeing materials selected from polyamide, cellulose ester, polyester, wool and other natural and synthetic fibers and generally exhibit improvements in dyeability and fastness properties.

The present dyes have the general structure:

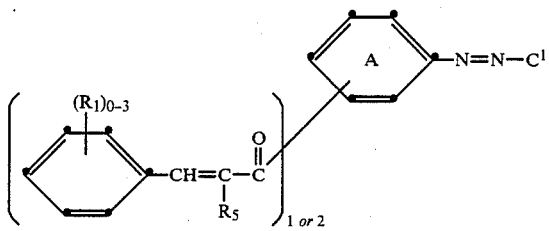

wherein $C^1$ is an aniline, tetrahydroquinoline, or benzomorpholine type coupler which may be substituted; ring A is unsubstituted or substituted in any positions not occupied by cinnamoyl groups, with 1–3 substituents preferably each of which is a substituent as defined for $R_1$; $R_5$ is H or alkyl; and each $R_1$ is alkyl, alkenyl of 2–6 carbons, aryl, cyclohexyl, alkoxy, halogen, hydroxy, alkylsulfonyl, cyano, carbamoyl, alkanoyl, alkanoyloxy, aroyl, alkoxycarbonyl, sulfamoyl, alkylsulfamoyl, dialkylsulfamoyl, alkanoylamino, $SO_3C_6H_5$, amino, alkylthio, thiocyano, arylsulfonyl, formyl, alkylcarbamoyl, dialkylcarbamoyl, $NO_2$, $-SO_3M$, $-OSO_3M$, $-COOH$, aryloxy, arylthio, alkylsulfonylamino, aroylamino, arylsulfonylamino, or cyclohexylthio, wherein the alkyl, alkylene, alkenyl, aryl, and cyclohexyl moieties of the above $R_1$ groups, e.g., the alkyl portions of the alkanoyl groups, are unsubstituted or substituted with 1–3 substituents different from the said moieties and independently selected from alkanoyloxy, alkyl, alkenyl, succinimido ($C_4H_4O_2N$), $-NO_2$, alkanoylamino, alkylsulfonylamino, 1-(2-pyrrolidono) ($C_4H_6ON$), halogen, cyano, alkoxy, aryl, cyclohexyl, hydroxy, $-SO_3M$, $-OSO_3M$, aryloxy, furyl ($C_4H_3O$), aroyloxy, alkoxycarbonyl, $-SO_2N$-(alkyl)$_2$, $-NHCOO$-alkyl, $-NHCONH$-alkyl, glutarimido ($C_5H_6O_2N$), phthalimido ($C_8H_4O_2N$), $CONH_2$, CONH-alkyl, CON(alkyl)$_2$, alkoxyalkoxy, alkylthio, arylthio, alkylsulfonyl, and arylsulfonyl, wherein M is selected from $H^+$, $NH_4^+$, $Na^+$, $K^+$, and the colorless cations of salts of primary, secondary, and tertiary aliphatic and arylamines, such as triethylamine, tri(2-hydroxyethyl)amine, di(2-hydroxyethyl)amine, N,N-dimethylaniline, and especially trimethylamine.

The couplers $C^1$ preferably have the formulae:

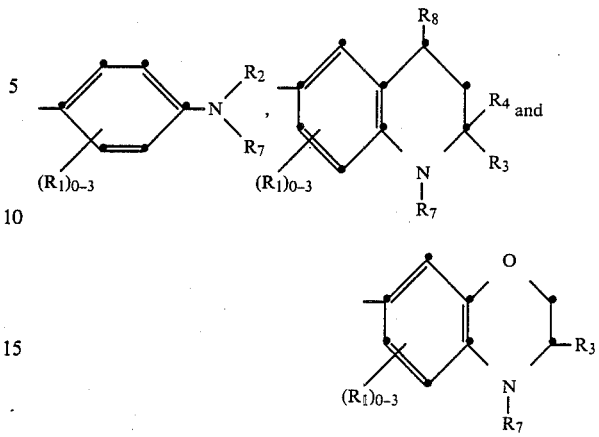

wherein $R_1$ is defined above; $R_2$ and $R_7$ are each selected independently from hydrogen, alkyl, alkenyl of 2–6 carbons, aryl, and cyclohexyl, all of which groups including alkylene moieties are unsubstituted or substituted as defined above for the substituted $R_1$ groups; and $R_3$, $R_4$ and $R_8$ are each selected from hydrogen and alkyl.

The various alkyl and alkylene moieties such as contained, for example, in alkoxy, alkanoyl, and alkoxyalkoxy groups within the above definitions preferably contain 1–6 carbons, and they and the alkenyl groups may be straight or branched chain, and the above aryl groups preferably contain from 6–10 ring carbons.

The following are typical specific $R_1$ groups: $CH_3$, $Cl$, $SO_2C_2H_5$, $CN$, $CONH_2$, $COC_2H_5$, $COC_6H_5$, $COOC_2H_5$, $SO_2NH_2$, $SO_2NHCH_3$, $SO_2N(C_2H_5)_2$, $NHCOC_2H_5$, $SO_3C_6H_5$, $SCH_3$, $SCN$, $SO_2C_6H_5$, $CHO$, $CONHC_2H_5$, $CON(C_2H_5)_2$, $OH$, $NO_2$, $C_6H_5$, $C_6H_{11}$, $SO_3K$, $CF_3$, $CH_2OOCC_2H_5$, $Br$, $SO_2CH_2CH_2OC_2H_5$, $I$, $CONHCH_2CN$, $COCH_2CH_2OH$, $COC_6H_3$-o-$CH_3$-p-$OCH_3$, $COOC_2H_4$-CH=$CH_2$, $SO_2NHCH_2CH_2CN$, $SO_2NHCH_2$-succinimido, $SO_2NHC_2H_4$-$C_6H_5$, $NHCOCH_2CH_2Cl$, $SO_3C_6H_4$-p-$NO_2$, $SCH_2CH_2OH$, $SC_2H_4$-$C_6H_{11}$, $SO_2C_6H_4$-p-$NHCOCH_3$, $C_6H_4$-p-$NHSO_2CH_3$, $CONHC_2H_4NHSO_2CH_3$, $CONHCH_2$-$H_2OH$, $CH_2CH_2NO_2$, $C_6H_4$-p-(2-pyrrolidono), $C_6H_{10}$-4-$CN$, $OSO_3K$, $CH_2SO_3Na$, $OC_6H_5$, $SO_2C_2H_4OSO_3K$, $C_2H_4$-furyl, $C_2H_4OOCC_6H_5$, $COCH_2CH_2COOCH_3$, $COC_6H_4$-p-$SO_2NHC_6H_5$, $COOCH_2CH_2$-$SO_2NHCH_3$, $SO_2NHCH_2SO_2N(C_2H_5)_2$, $SO_2NHCH_2NHCOOCH_3$, $SO_2NHC_2H_4NHCONHCH_3$, $NHCOCH_2CH_2$-glutarimido, $SO_3C_6H_4$-p-phthalimido, $SCH_2CONH_2$, $C_6H_4$-p-$SO_2CH_3$, $SO_2C_6H_4$-p-$CONHCH_2SO_3Na$, $CH_2SO_2C_6H_5$, $CONHCH_2CH_2CON(CH_3)_2$, $CONHCH_2CH_2OCH_2CH_2OCH_2CH_3$, $CH_2CH_2SO_3H$, $C_6H_4$-p-$SC_2H_5$, $C_6H_{10}$-4-$SC_6H_4$(p-$OSO_3H$), $CH_2CH=CH_2$, $COOH$, $OC_6H_5$, $OCH_3$, $SC_6H_5$, $NHSO_2CH_3$, $NHCOC_6H_5$, $NH_2$, $NHSO_2C_6H_5$, $SC_6H_{11}$, and $-OOCCH_3$.

Typical for $R_3$, $R_4$, $R_5$ and $R_8$ are: H, $CH_3$, $C_2H_5$, $C_4H_9$-n, and $CH_2(CH_3)_2$.

The following are typical specific $R_2$ and $R_7$ substituents: H, $CH_3$, $C_2H_5$, $C_4H_9$-n, $CH_2CH=CH_2$, $C_6H_5$, $C_6H_{11}$, $CH_2OOCC_2H_5$, $CH_2CH_2OC_2H_5$, $CH_2CN$, $CH_2CH_2OH$, $C_6H_3$-o-$CH_3$-p-$OCH_3$, $C_2H_4$-CH=$CH_2$, $CH_2$-succinimido, $CH_2CH_2$-$C_6H_5$, $CH_2CH_2Cl$, $C_6H_4$-p-$NO_2$, $CH_2CH_2C_6H_{11}$, $C_6H_4$-p-$NHSO_2CH_3$, $C_2H_4NHSO_2CH_3$, $CH_2CH_2NO_2$, $C_6H_4$-p-(2-pyrrolidono), $C_6H_{10}$-4-$CN$, $CH_2SO_3Na$, $CH_2CH_2OSO_3K$, CH$_2$CH$_2$-furyl, CH$_2$CH$_2$OOCC$_6$H$_5$, CH$_2$CH$_2$COOCH$_3$, C$_6$H$_5$-p-SO$_2$NHC$_6$H$_5$, CH$_2$CH$_2$SO$_2$NHCH$_3$, CH$_2$SO$_2$N(C$_2$H$_5$)$_2$, CH$_2$NHCOOCH$_3$, CH$_2$CH$_2$NHCONHCH$_3$, CH$_2$CH$_2$-glutarimido, C$_6$H$_4$-p-phthalimido, CH$_2$CONH$_2$, C$_6$H$_4$-p-SO$_2$CH$_3$, C$_6$H$_4$-p-CONHCH$_2$SO$_3$Na, CH$_2$SO$_2$C$_6$H$_5$, CH$_2$CH$_2$CON(CH$_3$)$_2$, CH$_2$CH$_2$OCH$_2$CH$_2$OC$_2$H$_5$, CH$_2$CH$_2$SO$_3$H, C$_6$H$_4$-p-SC$_2$H$_5$, and C$_6$H$_{10}$-4-SC$_6$H$_4$(p-OSO$_3$H)).

Preferred substituents, in addition to H, for the A ring are halogen, CN, methoxycarbonyl, alkoxy, CF$_3$, NO$_2$, alkanoyl, alkylsulfonyl, β-hydroxyethylcarbamoyl, β-potassiosulfatoethylcarbamoyl, methylcarbamoyl, carbamoyl, ethoxycarbonyl, or methyl; for R$_1$ on the cinnamoyl rings are H, alkyl, aralkyl, aralkyl substituted with —SO$_3$M or —SO$_4$M, cyclohexylalkyl, cyclohexylalkyl substituted with —SO$_3$M or —SO$_4$M, alkoxy, or alkanoylamino; for R$_2$ are H, alkyl, aralkyl, alkyl or aralkyl substituted with —SO$_3$M or —SO$_4$M, cyclohexylalkyl, cyclohexylalkyl substituted with —SO$_3$M or —SO$_4$M; for R$_7$ are H, alkyl, aralkyl, aralkyl substituted with —SO$_3$M or —SO$_4$M, cyclohexylalkyl, cyclohexylalkyl substituted with —SO$_3$M or —SO$_4$M, sodio- or potassiosulfatoalkyl, sodio- or potassiosulfonicalkyl, or alkanoyloxyalkyl; for R$_1$ on the couplers are H, aralkyl, aralkyl substituted with —SO$_3$M or —SO$_4$M, cyclohexylalkyl, cyclohexylalkyl substituted with —SO$_3$M or —SO$_4$M, —SO$_3$Na, —SO$_3$K, halogen, —SO$_4$Na, —SO$_4$K, alkyl, alkoxy, —COOH, or —OH; for R$_3$, R$_4$ and R$_8$ are H and alkyl; and for R$_5$ is hydrogen.

The dyes of this invention impart red to blue shades on natural and synthetic fibers and exhibit improvements over such dyes as disclosed in U.S. Pat. No. 2,805,218 and British Pat. No. 1,021,399 in one or more properties such as fastness to light, ozone, chlorine, oxides of nitrogen, washing, sublimation, heat disintegration, perspiration, and crocking, leveling, transfer, exhaustion, build, pH stability, and resistance to blooming.

The intermediate compounds used in this invention are prepared according to procedures well known to the art. The present dyes are readily prepared, for example, by reacting the acetyl group of the intermediate azo compound, which itself is a dye, with benzaldehyde or a substituted benzaldehyde in acetic acid with concentrated sulphuric acid as catalyst. The acetyl dye is thus converted to a cinnamoyl substituted dye in high yield. The water-solubilizing group may be the substituent on the benzaldehyde or it may be introduced into the cinnamoyl dye at a later stage by known methods. For example, a hydroxy group in either the diazonium component or the coupling component could be reacted with sulphuric acid and then with MOH to give the —OSO$_3$M group. Alternatively a chloroalkyl group in the dye could be reacted with K$_2$SO$_3$ to give the —CH$_2$SO$_3$K group. Also, sulphonation of an aromatic ring or other reactive group in the dye with a sulphonating agent such as H$_2$SO$_4$ or Cl—SO$_3$H would give the solubilizing group. Such groups could also be present in the coupling component prior to diazotisation and coupling.

The following Preparations, Example and tables will illustrate the making and use of intermediates for the synthesis of dyes of the present invention.

PREPARATION
A—α-(N-Ethylanilino)-Toluenesulfonic Acid

To a 30.0 g. of 100% sulfuric acid is added N-benzyl-N-ethylaniline (30.0 g.) dropwise below about 50° C. To this solution is added, at 50°–60° C., 60% oleum (30.0 g.) with good stirring. The mixture is stirred and heated at about 60° C. for three hours and then drowned into 200 ml. of water. The free sulfonic acid which is mostly the meta isomer with a small amount of para, precipitates on standing and is collected by filtration, washed with water, and dried. N-Benzylines containing groups such as alkyl, alkoxy, and halogen in the ortho, meta, or para positions of the benzyl group may also be sulfonated by this procedure. The exact location of the sulfonic acid group in these cases is often not known and mixtures usually are produced.

Aromatic amines which contain N-aralkyl groups and which are sulfonated by the above procedure to give Couplers 2 to 11 are listed below.

| COUPLER NO. | |
|---|---|
| 2 | N—Benzyl-N—ethyl-m-toluidine; |
| 3 | N—Benzyl-2,7-dimethyl-1,2,3,4-tetrahydroquinoline; |
| 4 | N—Benzyl-2,3-dihydro-3,6-dimethyl-1,4-benzoxazine; |
| 5 | N—Methyl-N—(2-phenylethyl)aniline; |
| 6 | N—Ethyl-N—(4-phenylbutyl)-3-chloroaniline; |
| 7 | N,N—Dibenzylaniline; |
| 8 | N—Benzyl-2,5-dimethylaniline; |
| 9 | N—Benzyl-2-methoxy-5-methylaniline; |
| 10 | N—Benzyl-2-methoxy-5-chloroaniline; and |
| 11 | N—Benzyl-N—cyclohexylaniline. |

PREPARATION B—Diazotization and Coupling of 2,6-dibromo-4-acetylaniline

To 150 g. of 60% acetic acid containing 10 g. of concentrated H$_2$SO$_4$ is added 8.2 g. (0.055 m.) of 2,6-dibromo-4-acetylaniline at room temperature. The solution is cooled to −5° C., and a solution of 3.6 g. NaNO$_2$ in 20 ml. of concentrated H$_2$SO$_4$ is added below 0° C. The reaction mixture is stirred at −5° to 0° C. for 1.5 hours. Each of the Couplers 1 to 11 (0.005 m.) is added to water, or a 0.005 mole aliquot of the coupler in dilute sulfuric acid is added to water, and cooled in an ice bath.

To each chilled coupler is added a 0.005 mole aliquot of the diazonium solution. The coupling mixture is treated with enough potassium acetate to neutralize the mineral acid. Water is added to the coupling mixture to a total volume of about 200 ml. and the dyes collected by filtration, washed with 10% KCl solution, and dried in air. The dyes usually are admixed with about an equal weight of K$_2$SO$_4$ and are used for dyeing without further purification to produce red shades on polyamides. These dyes are intermediates for the preparation of dyes of the present invention.

PREPARATION C—Sulfonation of Dye Containing an N-Aralkylamino Group

The dye from 2,6-dibromo-4-acetylaniline N-benzyl-N-ethylaniline (1.5 g.) is added portionwise to 15 ml. of concentrated H$_2$SO$_4$ over 20 min., allowing the temperature to rise to 30° C. The reaction mixture is then heated at 70° C., when the reaction is completed as evidenced by thin-layer chromatography. After the reaction mixture is drowned on ice-water mixture, 50% NaOH is added until the pH is about 7. The dye is collected by filtration, washed with water, and dried in air. The structure is as follows:

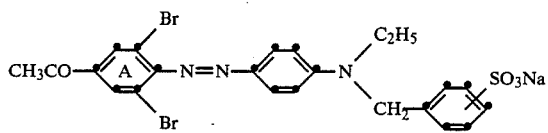

EXAMPLE

A mixture of compound (I) (2 g.), benzaldehyde (1.5 g.), acetic acid (25 ml.) and concentrated sulphuric acid (5 ml.) was stirred at 100° C. for 1.5 hours. The reaction mixture was poured into cold water and the product dye (II) filtered off, washed with water and dried. Compound (I) had previously been prepared by diazotising the known 2,6-dibromo-4-acetylaniline and coupling with N-ethyl-2,2,4,7-tetra-methyl-1,2,3,4-tetrahydroquinoline by known procedures. The dye (II) when applied to nylon, polyester and other synthetic fibres by known techniques gave bright, bluish red shades with good dyeing and fastness properties.

By using the methods described hereinabove, the following dyes are obtained.

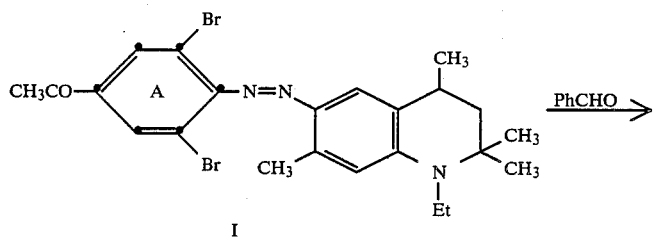

I

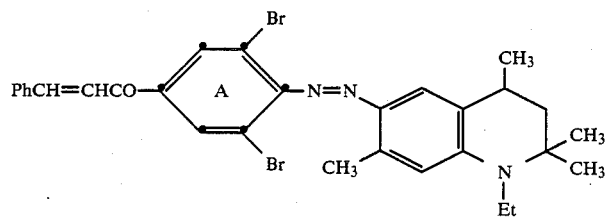

II

TABLE 1

| Cinnamoyl Group Position | $R_1$ on D | $R_5$ | Substituents on A | $R_1$ on C | $R_2$ | $R_7$ |
|---|---|---|---|---|---|---|
| 4 | H | H | H | H | H | H |
| 4 | 4-NO$_2$ | H | 6-COCH$_3$ | 2-CH$_3$ | C$_2$H$_5$ | Ph |
| 4 | 4-CN | H | 6-NO$_2$ | 5-COCH$_3$ | C$_2$H$_5$ | C$_6$H$_{11}$ |
| 4 | 5-COCH$_3$ | H | 5,6-di-Cl | 5-OCH$_3$ | CH$_2$—C$_6$H$_4$—p-SO$_4$K | CH$_2$—CH=CH$_2$ |
| 4 | 4-COPh | CH$_3$ | 6-CN | 5-SO$_3$Na | H | CH$_2$OOCC$_2$H$_5$ |
| 5 | 2,4-di-COOH | CH$_3$ | 4-NHSO$_2$CH$_3$ | 5-OCH$_2$CH$_2$SO$_4$K | CH$_2$—C$_6$H$_{10}$—4-SO$_3$K | C$_6$H$_4$—p-OOCCH$_3$ |
| 4 | 4-OOCCH$_3$ | CH$_3$ | 5-CH$_3$ | 5-OCH$_2$CH$_2$SO$_4$NH(Et)$_3$ | H | C$_6$H$_{10}$—4-CH$_3$ |
| 4 | 4-NHCOCH$_3$ | CH$_3$ | 6-OCH$_3$ | 2-CH$_3$ | CH$_2$—C$_6$H$_4$—p-SO$_4$NH(Et)$_3$ | CH$_2$CH$_2$(C$_6$H$_4$O$_2$N) |
| 4 | 4-NHCOPh | CH$_3$ | H | 2-CH$_3$ | CH$_3$ | CH$_2$CH$_2$NO$_2$ |
| 6 | 4-C$_2$H$_5$ | H | 5,6-di-SO$_3$Na | 2-NO$_2$ | CH$_3$ | C$_6$H$_4$—p-NO$_2$ |
| 6 | 4-Ph | H | H | 2-OCH$_3$ | CH$_3$ | CH$_2$NHOCCH$_3$ |
| 4 | Cl | H | H | 5-NHCOCH$_3$ | C$_2$H$_5$ | CH$_2$NHSO$_2$CH$_3$ |
| 4 | SO$_3$K | H | 6-SO$_3$Na | 3NHCOCH$_3$ | H | C$_2$H$_5$ |
| 4 | 2-Cl—4-SO$_2$CH$_3$ | H | 6-OCH$_2$CH$_2$SO$_4$K | 3-NHSO$_2$CH$_3$ | C$_2$H$_5$ | C$_6$H$_4$—p-NHOCH$_3$ |
| 4 | 4-NHSO$_2$CH$_3$ | H | 6-OCH$_2$CH$_2$SO$_4$K | 3-COOCH$_3$ | C$_2$H$_5$ | C$_6$H$_4$—p-NHSO$_2$CH$_3$ |
| 4 | 4-COOCH$_3$ | H | 6-NHCOPh | 3-COOH | C$_2$H$_5$ | C$_6$H$_4$—4-NHOOCH$_3$ |
| 4 | 2-OCH$_3$ | C$_2$H$_5$ | 4-NHCOPh | 2-Cl | CH$_2$CH$_2$Cl | CH$_2$CH$_2$Cl |
| 5 | 4-OC$_2$H$_5$ | C$_2$H$_5$ | 4-OOCCH$_3$ | 2,6-di-Br | C$_6$H$_4$—p-Br | C$_6$H$_4$—p-Br |
| 6 | 4-SO$_3$Na | C$_2$H$_5$ | 4-OOCC$_2$H$_5$ | 2,6-di-Br | C$_6$H$_4$—p-CN | C$_6$H$_4$—p-CN |
| 6 | 2-SO$_3$Na | H | 5-COOH | 2-OCH$_3$—5-NHCOCH$_3$ | CH$_3$ | CH$_2$CH$_2$CN |
| 6 | 2-OCH$_3$—4-SO$_3$K | H | H | 2-CH$_2$OOCCH$_3$ | CH$_2$CH$_2$OC$_2$H$_5$ | CH$_2$CH$_2$OC$_2$H$_5$ |
| 4 | 4-OCH$_2$CH$_2$OSO$_3$K | H | H | 2-CH$_2$Cl | CH$_2$CH$_2$OC$_2$H$_5$ | CH$_2$CH$_2$OCH$_2$CH$_2$OC$_2$H$_5$ |
| 4 | 2-SO$_3$Na—5-Cl | H | 6-SO$_2$CH$_3$ | 2-CN | CH$_2$Ph | CH$_2$—C$_6$H$_4$—p-SO$_4$N$^+$H(CH$_3$)$_3$ |
| 4 | 4-OH | H | 6-CF$_3$ | 2-OOCCH$_3$ | CH$_2$C$_6$H$_{11}$ | CH$_2$C$_6$H$_{10\ or\ 11}$-SO$_3$Na |
| 4 | 4-CH$_2$OOCCH$_3$ | C$_2$H$_7$—n | 6-COOCH$_3$ | 5-COOH | H | C$_6$H$_4$—o-OH |
| 4 | 4-SO$_3$K | C$_3$H$_7$—n | 6-CHO | 5-OH | C$_2$H$_5$ | CH$_2$CH$_2$OH |
| 4 | 4-OPh | H | 4-CONH$_2$ | 5-CH=CH$_2$ | CH$_2$CH$_2$—SO$_3$K | CH$_2$CH$_2$—SO$_3$K |
| 4 | 4-NO$_2$ | H | 4-CONHCH$_3$ | 2-CH$_3$ | H | CH$_2$—C$_6$H$_4$—p-OSO$_3$K |
| 5 | 5-CN | H | 4-CH$_2$Ph | 5-COCH$_3$ | H | CH$_2$OPh |
| 6 | 4-SO$_3$K | H | 6-CH$_2$SO$_3$K | 5-OCH$_3$ | H | CH$_2$SO$_2$NHPh |
| 6 | 5-CH$_3$ | H | 6-CH$_2$OSO$_3$K | 3-CH$_3$ | C$_2$H$_5$ | CH$_2$SO$_2$SO$_3$K |
| 6 | 5-C$_6$H$_4$—p-SO$_3$K | H | 6-C$_6$H$_4$—p-SO$_3$K | 5-SO$_3$Na | CH$_3$SO$_2$NHCH$_3$ | CH$_2$SO$_2$NHCH$_3$ |
| 5 | 5-OCH$_3$ | H | 6-CH$_2$OH | 5-OCH$_2$CH$_2$SO$_4$K | H | CH$_2$—C$_6$H$_4$—p-NHCOOCH$_3$ |
| 4 | 5-COOH | C$_4$H$_9$—n | 6-CH$_2$Cl | 5-OCH$_2$CH$_2$SO$_3$K | CH$_2$COOCH$_3$ | CH$_2$COOCH$_3$ |
| 4,5-di-Br | H | 6-C$_6$H$_4$—p-Br | 2-CH$_3$ | H | CH$_3$SO$_2$N(CH$_3$)$_2$ |
| 4 | 5-COOH | H | 6-CH$_2$Cl | 2-C$_6$H$_4$—p-SO$_3$K | C$_2$H$_5$ | C$_6$H$_4$—p-CONH$_2$ |
| H | H | H | 2-NO$_2$ | C$_2$H$_5$ | C$_6$H$_4$—p-NHCOCH$_3$ |
| 4 | 4-NO$_2$ | H | 5-NHCOCH$_3$ | 2-OCH$_3$ | C$_2$H$_5$ | C$_6$H$_4$—p-CONHCH$_3$ |
| 4 | 4-CN | H | 5-NO$_2$ | 5-NHCOCH$_3$ | C$_2$H$_5$ | CH$_2$CH$_2$SCH$_3$ |
| 4 | 5-COCH$_3$ | H | 5-Cl | 3-NHSO$_2$CH$_3$ | CH$_2$CH$_2$SCH$_3$ | CH$_2$—C$_6$H$_4$—p-SCH$_3$ |
| 4 | 4-COPh | CH$_3$ | 5,6-di-CN | 3-COOH | H | CH$_2$—C$_6$H$_4$—p-SO$_2$C$_2$H$_5$ |
| | | | | | CH$_3$SO$_2$C$_2$H$_5$ | CH$_3$SO$_2$C$_2$H$_5$ |

TABLE 1-continued

| Cinnamoyl Group Position | R₁ on D | R₅ | Substituents on A | R₁ on C | R₂ | R₇ |
|---|---|---|---|---|---|---|
| 4 | 2,4-di-COOH | CH₃ | 5-NHSO₂CH₃ | 2-Cl | H | CH₂SO₂Ph |
| 4 | 4-OOCCH₃ | CH₃ | 6-CH₃ | 2,6-di-Br | H | CH₂CH₂OSO₃K |
| 4 | 4-NHCOCH₃ | CH₃ | 6-OCH₃ | 2,6-di-Br | H | C₆H₄—p-OSO₃K |
| 4 | 4-NHCOPh | CH₃ | 6-Ph | 2-OCH₃—5-NHCOCH₃ | H | CH₂(C₆H₄O₂N) |
| 4,6 | 4-CH₂CH=CH₂ | H | H | 3-OCH₃ | C₂H₅ | C₂H₅ |
| 4 | H | CH₃ | H | 2-OCH₃—5-NHCOCH₃ | C₂H₅ | C₂H₅ |
| 4 | 4-SO₃K | H | 4-SO₃Na | 5-CH₂CONHCH₃ | C₂H₅ | CH₂CH₂SO₃K |
| 4 | 4-CONH₂ | H | 6-SO₃Na | 2-OCH₃—5-NHCOCH₃ | H | H |
| 4 | 3-SO₂NH₂ | H | 6-COCH₃ | 5-CH₂CONHCH₃ | H | Ph |
| 4 | 4-SO₂NHCH₃ | H | 6-NO₂ | 5-CH₂CON(CH₃)₂ | C₂H₅ | C₆H₁₁ |
| 4 | 4-SO₂N(C₂H₅)₂ | CH₃ | 6-Cl | 5-CH₂CH₂OCH₂CH₂OC₂H₅ | H | CH₂—CH=CH₂ |
| 4 | 4-SO₃C₆H₅ | CH₃ | 6-CN | 5-CH₂SC₂H₅ | C₂H₅ | CH₂—OOCC₂H₅ |
| 4 | 4-SCH₃ | CH₃ | 6-NHSO₂CH₃ | 5-CH₂SC₆H₅ | H | C₆H₄—p-OOCCH₃ |
| 4 | 2,4-di-SCN | CH₃ | 5-CH₃ | 5-CH₂SO₂C₂H₅ | H | C₆H₁₀—4-CH₃ |
| 4 | 4-SO₂C₆H₅ | CH₃ | 5-OCH₃ | 5-CH₂SO₂C₆H₅ | CH₃ | CH₂CH(C₄H₄O₂N) |
| 4 | 2-CHO—4-CN | CH₃ | 6-Ph | 5-C₆H₃—o,p-di-CN | CH₃ | C₆H₄—p-NO₂ |
| 4 | 4-CONHC₂H₅ | CH₃ | H | 5-C₆H₂—o,m,p-tri-Cl | CH₃ | CH₂NO₂NO₂ |
| 4 | 4-CON(C₂H₅)₂ | CH₃ | H | 2,6-di-OSO₃N H(CH₃)₃ | CH₃ | CH₂NHOCCH₃ |
| 4 | 3-C₆H₁₁ | H | 6-SO₃K | 2,6-di-SO₃N H(CH₃)₃ | C₂H₅ | CH₂NHSO₂CH₃ |
| 4 | 3-SC₆H₅ | H | 6-SO₃Na | 2-SO₃N H(CH₃)₃ | C₂H₅ | C₆H₄—p-NHOCCH₃ |
| 4 | 4-NHSO₂C₆H₅ | H | 5-OCH₂CH₂SO₄K | 2-OSO₃N H(CH₃)₃ | C₂H₅ | C₆H₄—p-NHSO₂CH₃ |
| 4 | 4-SC₆H₁₁ | H | 5-OCH₂CH₂SO₄K | 5-SC₆H₄—p-SO₃K | C₂H₅ | C₆H₁₀—4-NHOCCH₃ |
| 4 | 4-C₆H₄—p-CH₃ | C₂H₅ | 6-NHCOPh | 5-C₆H₄—p-CH₃ | CH₂CH₂Cl | CH₂CH₂Cl |
| 4 | 4-C₆H₄—p-CH₂CH=CH₂ | C₂H₅ | 6-NHCOPh | 5-C₆H₄—p-CH₂CH=CH₂ | C₆H₄—p-Br | C₆H₄—p-Br |
| 4 | 4-OCH₂CH₂NO₂ | C₂H₅ | 5-NHCOCH₃ | 5-OCH₃—NO₂ | C₆H₄—p-CN | C₆H₄—p-CN |
| 4 | 2-CH₂NHCOCH₃ | C₂H₅ | 5-OOCC₂H₅ | 2-CH₂NHCOCH₃ | CH₂CH₂CN | CH₂CN |
| 4 | 4-CH₂NHSO₂C₂H₅ | H | 6-COOH | 5-CH₂NHSO₂C₂H₅ | CH₂CH₂OC₂H₅ | CH₂CH₂OC₂H₅ |
| 4,6 | 4-CH₂NHSO₂Cl | H | H | 5-CH₂SO₂Cl | CH₂CH₂OCH₂CH₂OC₂H₅ | CH₂CH₂OCH₂CH₂OC₂H₅ |
| 6 | 2,6-di-CH₂CN | H | 2,6-di-CH₂CN | 2,6-di-CH₂CN | CH₂Ph | CH₂Ph |
| 6 | 4-CH₂CH₂OC₂H₅ | H | 4-CH₂C₆H₅ | 5-CH₂CH₂OC₂H₅ | CH₂C₆H₁₁ | C₆H₄—o-OH |
| 6 | 4-CH₂C₆H₁₁ | H | 4-COOCH₃ | 5-COOH | H | CH₂CH₂OH |
| 6 | 4-CH₂CH(OH)CH₂OH | C₃H₇—n | 4-CHO | 5-CH₂CH(OH)CH₂OH | C₂H₅ | CH₂CH₂—SO₃K |
| 6 | 4-CH₂—SO₃K | C₃H₇—n | 5-CONH₂ | 5-CH₂—SO₃K | CH₂CH₂—SO₃K | C₆H₄—p-OSO₃K |
| 4 | 4-CH₂CH₂C₂H₅ | H | 5-CONHCH₃ | 5-C₆H₄—p-CH₃ | H | CH₂OPh |
| 4 | 4-OOCC₆H₅ | C₂H₅ | 5-CH₂Ph | 5-CH₂OC₆H₅ | H | CH₂SO₂NHPh |
| 4 | 4-COOCH₃ | H | 5-CONHCH₃ | 5-CH₂COOCH₃ | H | CH₂SO₂NHCH₃ |
| 4 | 5-CH₂COOCH₃ | H | 5-CH₂SO₃K | 5-CH₂COOCH₃ | CH₂SO₂NHCH₃ | C₆H₄—p-SO₂NHCH₃ |
| 4 | 4-C₆H₄—p-SO₂N(C₂H₅)₂ | H | 6-CH₂SO₃K | 5-C₆H₄—p-SO₂N(C₂H₅)₂ | CH₂COOCH₃ | CH₂COOCH₃ |
| 4 | CH₂CH₂NHCOOCH₃ | H | 6-C₆H₄—p-SO₃K | 5-CH₂CH₂NHCOOCH₃ | H | CH₂SO₂N(CH₃)₃ |
| 4 | 4-CH₂NHCONHCH₃ | H | 6-CH₂CH₂OH | 5-CH₂NHCONHCH₃ | C₂H₅ | C₆H₄—p-NHCOOCH₃ |
| 4 | 4-CH₂CONH₂ | H | 6-CH₂Cl | 5-CONH₂ | C₂H₅ | CH₂CH₂CONH₂ |
| 4 | 5-CH₂CONHCH₃ | C₄H₉—n | 6-C₆H₄—p-Br | | | |

TABLE 1-continued

| Cinnamoyl Group Position | R₁ on D | R₅ | Substituents on A | R₁ on C | R₂ | R₇ |
|---|---|---|---|---|---|---|
| 4 | 4-CH₂CON(CH₃)₂ | H | H | 3-SO₂NH₂ | C₂H₅ | C₆H₄—p-CONHCH₃ |
| 4 | 4-CH₂CH₂OCH₂CH₂OC₂H₅ | H | 5-COCH₃ | 5-SO₂NHCH₃ | C₂H₅ | C₆H₄—p-SCH₃ |
| 4,6 | 4-CH₂SC₂H₅ | H | 5-NO₂ | 5-SO₂N(C₂H₅)₂ | CH₂CH₂SCH₃ | CH₂CH₂SCH₃ |
| 6 | 5-CH₂SC₆H₅ | CH₃ | 4-Cl | 5-SO₂C₆H₅ | H | CH₂—C₆H₄—p-SCH₃ |
| 4 | 4-CH₂SO₂C₂H₅ | CH₃ | 6-CN | 5-SCH₃ | CH₂SO₂C₂H₅ | CH₂SO₂C₂H₅ |
| 4 | 2,4-di-CH₂SO₂C₆H₅ | CH₃ | 6-NHSO₂CH₃ | 2,5-di-SCN | H | CH₂SO₂Ph |
| 4 | 4-C₆H₃—o,p-di-CN | CH₃ | 5-CH₃ | 5-SO₂C₆H₅ | H | CH₂CH₂OSO₃K |
| 4 | 4-C₆H₂—o,m,p-tri-Cl | CH₃ | 5-OCH₃ | 2-CHO—6-CN | H | C₆H₄—p-OSO₃K |
| 4 | 2,6-di-OSO₃Na | H | 6-Ph | 5-CONHC₂H₅ | H | CH₂—(C₈H₄O₂N) |
| 4 | H | H | 6-CH₂(C₄H₄O₂N) | 5-CON(C₂H₅)₂ | C₂H₅ | C₂H₅ |
| 4 | H | H | 6-CH₂(C₄H₃O) | 3-C₆H₁₁ | C₂H₅ | C₂H₅ |
| 4 | 5-CH₂(C₈H₄O₂N) | H | H | 3-SC₆H₅ | C₂H₅ | C₂H₅ |
| 4 | 5-CH₂(C₄H₃O) | H | H | 6-NHSO₂C₆H₅ | C₂H₅ | C₂H₅ |
| 4 | 2-Cl,SO₃M | H | 2,6-di-Br | 2-OCH₃—5-CH₃ | H | C₂H₅ |
| 4 | H | H | 2,6-di-Br | 2-OCH₃—5-CH₃ | H | C₂H₅ |

TABLE 2

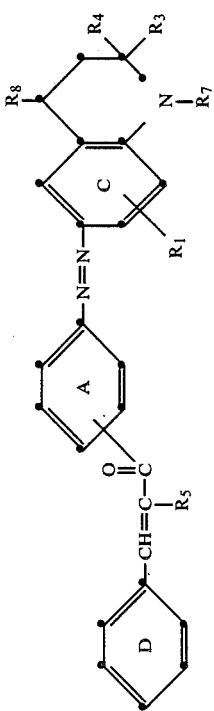

| Cinnamoyl Group Position | $R_5$ | Substituents on A | $R_1$ on C | $R_3$ | $R_4$ | $R_8$ | $R_7$ |
|---|---|---|---|---|---|---|---|
| 4 | H | H | H | H | H | H | H |
| 4 | 4-NO$_2$ | H | 5-COCH$_3$ | 7-CH$_3$ | CH$_3$ | CH$_3$ | CH$_3$ | Ph |
| 4 | 4-CN | H | 5-NO$_2$ | 5-COCH$_3$ | CH$_3$ | CH$_3$ | H | C$_6$H$_{11}$ |
| 4 | 5-COCH$_3$ | H | 5-Cl | 5-OCH$_3$ | CH$_3$ | CH$_3$ | H | CH$_2$—CH=CH$_2$ |
| 4,5 | 4-COPh | CH$_3$ | 6-CN | 7-SO$_3$Na | CH$_3$ | CH$_3$ | H | CH$_2$OOCC$_2$H$_5$ |
| 5 | 2,4-di-COOH | CH$_3$ | 4-NHSO$_2$CH$_3$ | 7-OCH$_2$CH$_2$SO$_4$K | CH$_3$ | CH$_3$ | H | C$_6$H$_4$—p-OOCCH$_3$ |
| 6 | 4-OOCCH$_3$ | CH$_3$ | 5-CH$_3$ | 7-OCH$_2$CH$_2$SO$_4$N H(Et)$_3$ | CH$_3$ | CH$_3$ | H | C$_6$H$_{10}$—4-CH$_3$ |
| 6 | 4-NHCOCH$_3$ | CH$_3$ | 4,5-di-OCH$_3$ | 7-CH$_3$ | CH$_3$ | CH$_3$ | H | CH$_2$CH$_2$(C$_4$H$_4$O$_2$N) |
| 6 | 4-NHCOPh | CH$_3$ | 4-Ph | 7-Ph | CH$_3$ | CH$_3$ | H | CH$_2$CH$_2$NO$_2$ |
| 6 | 4-C$_2$H$_5$ | H | H | 7-NO$_2$ | CH$_3$ | CH$_3$ | H | C$_6$H$_4$—p-NO$_2$ |
| 4 | 2,5-di-Cl | H | 6-SO$_3$Na | 7-NHCOCH$_3$ | CH$_3$ | CH$_3$ | H | CH$_2$NHCOCH$_3$ |
| 4 | 2-Cl—4-SO$_2$CH$_3$ | H | 6-SO$_3$Na | 7-NHSO$_2$CH$_3$ | CH$_3$ | CH$_3$ | H | C$_6$H$_4$—p-NHOCCH$_3$ |
| 6 | 4-NHSO$_2$CH$_3$ | H | 5-OCH$_2$CH$_2$SO$_4$K | 7-COOCH$_3$ | CH$_3$ | CH$_3$ | H | C$_6$H$_4$—p-NHSO$_2$CH$_3$ |
| 4 | 4-COOCH$_3$ | H | 5-OCH$_2$CH$_2$SO$_4$K | 7-COOH | CH$_3$ | C$_2$H$_5$ | H | C$_6$H$_{10}$—4-NHOCCH$_3$ |
| 4 | 2-OCH$_3$ | C$_2$H$_5$ | 6-NHCOPh | 7-Cl | H | H | C$_2$H$_5$ | CH$_2$C$_6$H$_4$Cl |
| 4 | 4-OC$_2$H$_5$ | C$_2$H$_5$ | 6-NHCOPh | 5,7-di-Br | CH$_3$ | CH$_3$ | CH$_3$ | C$_6$H$_4$—p-Br |
| 4 | 2-SO$_3$Na | C$_2$H$_5$ | 6-NHCOCH$_3$ | 5,7-di-Br | CH$_3$ | CH$_3$ | H | C$_6$H$_4$—p-CN |
| 4 | 2-OCH$_3$—4-SO$_3$K | H | 5-OOCCH$_3$ | 5-OCH$_3$—7-NHCOCH$_3$ | CH$_3$ | CH$_3$ | H | CH$_2$CH$_2$CN |
| 4 | 4-OCH$_2$CH$_2$OSO$_3$K | H | 6-COOH | 7-CH$_2$OOCCH$_3$ | CH$_3$ | CH$_3$ | H | CH$_2$CH$_2$OC$_2$H$_5$ |
| 4 | 2-SO$_3$Na—5-Cl | H | H | 7-CH$_2$Cl | CH$_3$ | CH$_3$ | H | CH$_2$CH$_2$OCH$_2$CH$_2$OC$_2$H$_5$ |
| 4 | 4-Cl | H | 5-SO$_2$CH$_3$ | 7-CN | CH$_3$ | CH$_3$ | H | CH$_2$Ph |
| 4 | 4-OH | H | 5-CF$_3$ | 7-COOCH$_3$ | CH$_3$ | CH$_3$ | H | CH$_2$C$_6$H$_{11}$ |
| 4 | 4-CH$_2$OOCCH$_3$ | C$_3$H$_7$—n | 5-COOCH$_3$ | 5-COOH | CH$_3$ | CH$_3$ | H | C$_6$H$_4$—o-OH |
| 4,6 | 4-SO$_3$K | C$_3$H$_7$—n | 5-CHO | 5-OH | CH$_3$ | CH$_3$ | H | CH$_2$CH$_2$OH |
| 6 | 4-OPh | H | 5-CONH$_2$ | 5-CH$_2$CH=CH$_2$ | CH$_3$ | CH$_3$ | H | CH$_2$CH$_2$—SO$_3$K |
| 4 | 4-NO$_2$ | H | 4-CONHCH$_3$ | 7-CH$_3$ | CH$_3$ | CH$_3$ | H | C$_6$H$_4$—p-OSO$_3$K |
| 4 | 5-CN | H | 5-CH$_2$Ph | 7-COCH$_3$ | CH$_3$ | CH$_3$ | H | CH$_2$OPh |
| 4 | 4-COCH$_3$ | H | 5-CH$_2$SO$_3$K | 7-SO$_3$Na | CH$_3$ | C$_2$H$_5$ | C$_2$H$_5$ | CH$_2$SO$_2$NHPh |
| 4 | 5-CH$_3$ | H | 5-CH$_2$OSO$_3$K | 7-OCH$_2$CH$_2$SO$_4$K | CH$_3$ | CH$_3$ | CH$_3$ | CH$_2$SO$_2$NHCH$_3$ |
| 4 | 5-Ph | H | 5-C$_6$H$_4$—p-SO$_3$K | 7-OCH$_2$CH$_2$SO$_3$K | CH$_3$ | CH$_3$ | H | C$_6$H$_4$—p-SO$_2$NHCH$_3$ |
| 4 | 5-OCH$_3$ | H | 5-CH$_2$CH$_2$OH | 7-CH$_3$ | CH$_3$ | CH$_3$ | H | C$_6$H$_4$—p-COOCH$_3$ |
| 4 | 4,5-di-Br | C$_4$H$_9$—n | 5-CH$_2$Cl | 7-Ph | CH$_3$ | H | H | CH$_2$COOCH$_3$ |
| 4 | 5-COOH | H | 6-C$_6$H$_4$—p-Br | 7-NO$_2$ | H | CH$_3$ | CH$_3$ | CH$_2$SO$_2$N(CH$_3$)$_2$ |
| 4 | H | H | H | 7-NO$_2$ | CH$_3$ | CH$_3$ | H | C$_6$H$_4$—p-NHCOOCH$_3$ |
| 4 | 4-NO$_2$ | H | 6-COCH$_3$ | 7-NHCOCH$_3$ | CH$_3$ | CH$_3$ | H | CH$_2$CONH$_2$ |
| 4 | 4-CN | H | 6-NO$_2$ | 7-NHSO$_2$CH$_3$ | CH$_3$ | CH$_3$ | H | C$_6$H$_4$—p-CONHCH$_3$ |
| 4 | 5-COCH$_3$ | H | 6-Cl | 7-COOCH$_3$ | CH$_3$ | CH$_3$ | H | C$_6$H$_4$—p-SCH$_3$ |
| 4 | 4-COPh | CH$_3$ | 6-CN | 7-COOH | CH$_3$ | CH$_3$ | H | CH$_2$—C$_6$H$_4$—p-SCH$_3$ |
| 4 | 4-COPh | CH$_3$ | 6-CN | 7-COOH | CH$_3$ | CH$_3$ | H | CH$_2$SO$_2$C$_2$H$_5$ |

TABLE 2-continued

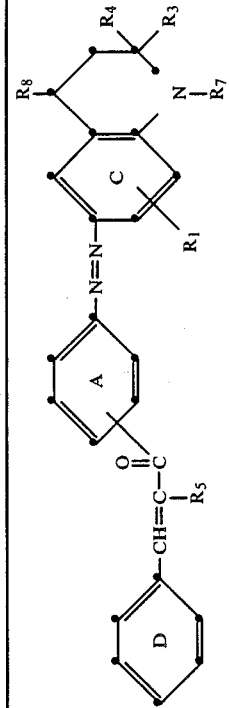

| Cinnamoyl Group Position | $R_1$ on D | $R_5$ | Substituents on A | $R_1$ on C | $R_3$ | $R_4$ | $R_8$ | $R_7$ |
|---|---|---|---|---|---|---|---|---|
| 4 | 2,4-di-COOH | $CH_3$ | 5-$NHSO_2CH_3$ | 7-Cl | $CH_3$ | $CH_3$ | H | $CH_2SO_2Ph$ |
| 4 | 4-OOCCH$_3$ | $CH_3$ | 6-$CH_3$ | 5,7-di-Br | $CH_3$ | H | H | $CH_2CH_2OSO_3K$ |
| 4 | 4-NHCOCH$_3$ | $CH_3$ | 6-$OCH_3$ | 5,7-di-Br | $CH_3$ | H | H | $C_6H_4$—p-$OSO_3K$ |
| 4 | 4-NHCOPh | $CH_3$ | 6-Ph | 5-$OCH_3$—7-$NHCOCH_3$ | $CH_3$ | H | H | $CH_2(C_8H_4O_2N)$ |
| 5 | 4-$CH_2CH=CH_2$ | H | H | 7-$NHCOCH_3$ | $C_2H_5$ | $CH_3$ | H | $C_2H_5$ |
| 4 | H | $CH_3$ | H | 7-OCPh | $C_2H_5$ | $CH_3$ | H | $C_2H_5$ |
| 4,6 | 4-$CONH_2$ | H | H | 7-$CH_2CONHCH_3$ | H | H | $CH_3$ | H |
| 6 | 3-$SO_2NH_2$ | H | 4-$COCH_3$ | 7-$CH_3CON(CH_3)_2$ | $CH_3$ | $CH_3$ | H | Ph |
| 6 | 4-$SO_2NHCH_3$ | H | 4-$NO_2$ | 7-$CH_2CH_2OCH_2CH_2OC_2H_5$ | $CH_3$ | $CH_3$ | H | $C_6H_{11}$ |
| 6 | 4-$SO_2N(C_2H_5)_2$ | H | 4-Cl | 7-$CH_2SC_2H_5$ | $CH_3$ | $CH_3$ | H | $CH_2$—CH=$CH_2$ |
| 4 | 4-$SO_3C_6H_5$ | $CH_3$ | 6-CN | 7-$CH_2SC_6H_5$ | $CH_3$ | $CH_3$ | H | $CH_2OOCC_2H_5$ |
| 5 | 4-$SCH_3$ | $CH_3$ | 4-$NHSO_2CH_3$ | 7-$SO_2C_2H_5$ | $CH_3$ | $CH_3$ | H | $C_6H_4$—p-$OOCCH_3$ |
| 4 | 2,4-di-SCN | H | 6-$CH_3$ | 7-$SO_2C_6H_5$ | $CH_3$ | H | H | $C_6H_{10}$—4-$CH_3$ |
| 4 | 4-$SO_2C_6H_5$ | H | 6-$OCH_3$ | 7-$C_6H_3$—o,p-di-CN | $CH_3$ | H | H | $CH_2CH_2$—($C_4H_4O_2N$) |
| 4 | 2-CHO—4-CN | $CH_3$ | 6-Ph | 7-$C_6H_2$—o,m,p-tri-Cl | $CH_3$ | $CH_3$ | H | $CH_2NO_2$ |
| 4 | 4-$CONHC_2H_5$ | $CH_3$ | H | 5,7-di-$OSO_3NH(CH_3)_3$ | $CH_3$ | $CH_3$ | H | $C_6H_4$—p-$NO_2$ |
| 4 | 4-$CON(C_2H_5)_2$ | H | 6-$SO_3Na$ | 5,7-di-$OSO_3Na$ | $CH_3$ | $CH_3$ | H | $CH_2NHOCCH_3$ |
| 4 | 3-$C_6H_{11}$ | H | 6-$SO_3Na$ | $OSO_3NH(CH_3)_3$ | $CH_3$ | $CH_3$ | H | $CH_2NHSO_2CH_3$ |
| 4 | 3-$SC_6H_5$ | H | 6-$OCH_2CH_2SO_4K$ | 5,7-di-$OSO_3Na$ | $CH_3$ | $CH_3$ | H | $C_6H_4$—p-NHOCCH$_3$ |
| 4 | 4-$NHSO_2C_6H_5$ | H | 6-$OCH_2CH_2SO_4K$ | 7-$SC_6H_{11}$ | $CH_3$ | $CH_3$ | H | $C_6H_4$—p-$NHSO_2CH_3$ |
| 4 | 4-$SC_6H_{11}$ | $C_2H_5$ | 6-NHCOPh | 7-$C_6H_4$—p-$CH_3$ | $C_2H_5$ | $C_2H_5$ | $C_2H_5$ | $C_6H_{10}$—4-NHOCCH$_3$ |
| 4 | 4-$C_6H_4$—p-$CH_3$ | $C_2H_5$ | 4-NHCOPh | 7-$C_6H_4$—p-$CH_2CH=CH_2$ | $CH_3$ | $CH_3$ | $CH_3$ | $CH_2CH_2Cl$ |
| 5 | 4-$C_6H_4$—p-$CH_2NO_2$ | $C_2H_5$ | 4-$NHCOCH_3$ | 7-$OCH_2CH_2NO_2$ | H | H | H | $C_6H_4$—p-Br |
| 4 | 4-$OCH_2NHCOCH_3$ | $C_2H_5$ | 4-$OOCC_2H_5$ | 7-$CH_2NHCOCH_3$ | $CH_3$ | $CH_3$ | H | $C_6H_4$—p-CN |
| 6 | 2-$CH_2NHSO_2C_2H_5$ | H | 5-COOH | 7-$CH_2NHSO_2C_2H_5$ | H | H | H | $CH_2CH_2CN$ |
| 4 | 4-$CH_2NHCOC_2H_5$ | H | H | 7-$CH_2CH_2CN$ | $CH_3$ | $CH_3$ | H | $CH_2CH_2OC_2H_5$ |
| 4,6 | 4-$CH_2CH_2Cl$ | H | 4-$SO_2CH_3$ | 5,7-di-$CH_2CN$ | H | H | H | $CH_2CH_2OCH_2CH_2OC_2H_5$ |
| 6 | 2,6-di-$CH_2CN$ | H | 6-$CH_2C_6H_5$ | 7-$CH_2CH_2OC_2H_5$ | $CH_3$ | $CH_3$ | H | $CH_2Ph$ |
| 6 | 4-$CH_2CH_2OC_2H_5$ | H | 6-$COOCH_3$ | 7-COOH | $CH_3$ | $CH_3$ | $C_2H_5$ | $C_6H_{11}$ |
| 4 | 4-$CH_2C_6H_5$ | $C_3H_7$—n | 6-CHO | 7-$CH_2C_6H_{11}$ | $CH_3$ | $CH_3$ | $CH_3$ | $C_6H_4$—o-OH |
| 4 | 4-$CH_2C_6H_{11}$ | $C_3H_7$—n | 6-$CONH_2$ | 7-$CH(OH)CH_2OH$ | $CH_3$ | $CH_3$ | H | $CH_2CH_2OH$ |
| 4 | 4-$CH_2CH(OH)CH_2OH$ | H | 6-$CONHCH_3$ | 7-$CH_2$—$SO_3K$ | $CH_3$ | $CH_3$ | H | $CH_2CH_2Cl$ |
| 5 | 4-$CH_2OC_6H_5$ | H | 4-$C_6H_4$—p-$CH_2CH=CH_2$ | 7-$OCC_6H_5$ | H | H | H | $C_6H_4$—p-$OSO_3K$ |
| 6 | 4-$CH_2OOCC_6H_5$ | H | 5-$CH_2Ph$ | 7-$OOCC_6H_5$ | $CH_3$ | $CH_3$ | H | $CH_2OPh$ |
| 6 | 4-$CH_2COOCH_3$ | H | 5-$CH_2SO_3K$ | 7-$CH_2COOCH_3$ | H | H | H | $CH_2SO_2NHPh$ |
| 4 | 5-$CH_2COOCH_3$ | H | 5-$CH_2OSO_3K$ | 7-$C_6H_4$—p-$SO_2N(C_2H_5)_2$ | $CH_3$ | $CH_3$ | H | $CH_2SO_2NHCH_3$ |
| 4 | 4-$C_6H_4$—p-$SO_2N(C_2H_5)_2$ | H | 6-$C_6H_4$—p-$SO_3K$ | 7-$CH_2CH_2NHCOOCH_3$ | $CH_3$ | $CH_3$ | H | $C_6H_4$—p-$SO_2NHCH_3$ |
| 4 | 4-$CH_2NHCOOCH_3$ | H | 6-$CH_2CH_2OH$ | 7-$CH_2NHCONHCH_3$ | $CH_3$ | $CH_3$ | H | $C_2COOCH_3$ |
| 4 | 4-$CH_2NHCONHCH_3$ | H | 6-$CH_2CH_2OH$ | 7-$CH_2NHCONHCH_3$ | $CH_3$ | $CH_3$ | H | $CH_2SO_2N(CH_3)_2$ |
| 6 | 4-$CH_2CONH_2$ | H | 4-$CH_2Cl$ | 7-$CH_2CONH_2$ | $CH_3$ | $CH_3$ | H | $C_6H_4$—p-$NHCOOCH_3$ |

TABLE 2-continued

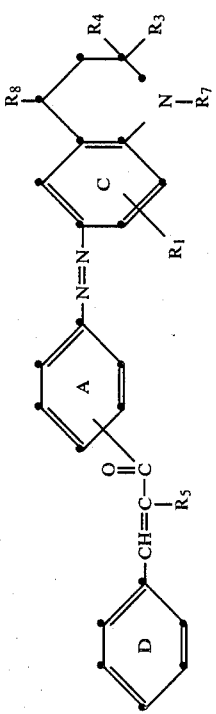

| Cinnamoyl Group Position | $R_1$ on D | $R_5$ | Substituents on A | $R_1$ on C | $R_3$ | $R_4$ | $R_8$ | $R_7$ |
|---|---|---|---|---|---|---|---|---|
| 4 | 5-CH$_2$CONHCH$_3$ | C$_4$H$_9$—n | 5-C$_6$H$_4$—p-Br | 7-CONH$_2$ | H | H | H | CH$_2$CH$_2$CONH$_2$ |
| 4 | 4-CH$_2$CON(CH$_3$)$_2$ | H | H | 7-SO$_2$NH$_2$ | CH$_3$ | CH$_3$ | CH$_3$ | C$_6$H$_4$—p-CONHCH$_3$ |
| 4 | 4-CH$_2$CH$_2$OCH$_2$CH$_2$OC$_2$H$_5$ | H | 6-COCH$_3$ | 7-SO$_2$NHCH$_3$ | CH$_3$ | CH$_3$ | H | C$_6$H$_4$—p-SCH$_3$ |
| 4 | 4-CH$_2$SC$_2$H$_5$ | H | 6-NO$_2$ | 7-SO$_2$N(C$_2$H$_5$)$_2$ | CH$_3$ | CH$_3$ | H | CH$_2$CH$_2$SCH$_3$ |
| 4,5 | 5-CH$_2$SC$_6$H$_5$ | CH$_3$ | 6-Cl | 7-SO$_3$C$_6$H$_5$ | CH$_3$ | CH$_3$ | H | CH$_2$—C$_6$H$_4$—p-SCH$_3$ |
| 6 | 4-CH$_2$SO$_2$C$_2$H$_5$ | CH$_3$ | 4-CN | 7-SCH$_3$ | CH$_3$ | CH$_3$ | H | CH$_2$SO$_2$C$_2$H$_5$ |
| 6 | 2,4-di-CH$_2$SO$_2$C$_6$H$_5$ | CH$_3$ | 4-NHSO$_2$CH$_3$ | 5,7-di-SCN | CH$_3$ | H | H | CH$_2$SO$_2$Ph |
| 4 | 4-C$_6$H$_3$—o,p-di-CN | CH$_3$ | 6-CH$_3$ | 7-SO$_2$C$_6$H$_5$ | CH$_3$ | H | H | C$_6$H$_4$—p-OSO$_3$K |
| 4 | 4-C$_6$H$_2$—o,m,p-tri-Cl | CH$_3$ | 6-OCH$_3$ | 5-CHO—7-CN | CH$_3$ | H | H | C$_6$H$_4$—p-OSO$_3$K |
| 4 | 2,6-di-OSO$_3$Na | H | 6-Ph | 7-CONHC$_2$H$_5$ | CH$_3$ | H | H | CH$_2$(C$_8$H$_4$O$_2$N) |
| 4 | H | H | 6-CH$_2$(C$_4$H$_4$O$_2$N) | 7-CON(C$_2$H$_5$)$_2$ | CH$_3$ | H | H | C$_2$H$_5$ |
| 4 | H | H | 5-CH$_2$(C$_4$H$_3$O) | 7-C$_6$H$_{11}$ | CH$_3$ | H | H | C$_2$H$_5$ |
| 4 | 5-CH$_2$(C$_8$H$_4$O$_2$N) | H | H | 7-SC$_6$H$_5$ | CH$_3$ | C$_2$H$_5$ | C$_2$H$_5$ | C$_2$H$_5$ |
| 4 | 5-CH$_2$(C$_4$H$_3$O) | H | H | 7-NHSO$_2$C$_6$H$_5$ | CH$_3$ | CH$_3$ | CH$_3$ | C$_2$H$_5$ |
| 2 | 4-OSO$_3$K | H | H | 7-CH$_3$ | CH$_3$ | CH$_3$ | CH$_3$ | H |

TABLE 3

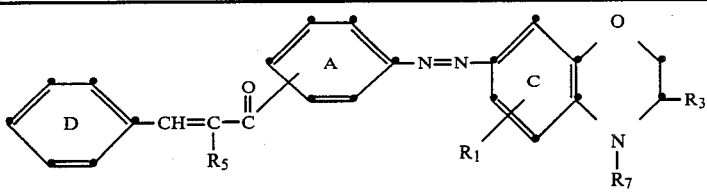

| Cinnamoyl Group Position | $R_1$ on D | $R_5$ | Substituents on A | $R_1$ on C | $R_3$ | $R_7$ |
|---|---|---|---|---|---|---|
| 4 | H | H | H | H | H | H |
| 4 | 4-$NO_2$ | H | 5-$COCH_3$ | 6-$CH_3$ | $CH_3$ | Ph |
| 4 | 4-CN | H | 5-$NO_2$ | 6-$COCH_3$ | $C_2H_5$ | $C_6H_{11}$ |
| 4 | 5-$COCH_3$ | H | 6-Cl | 6-$OCH_3$ | H | $CH_2$—CH=$CH_2$ |
| 4 | 4-COPh | $CH_3$ | 6-CN | 6-$SO_3Na$ | H | $CH_2OOCC_2H_5$ |
| 5 | 2,4-di-COOH | $CH_3$ | 4-$NHSO_2CH_3$ | 6-$OCH_2CH_2SO_4K$ | H | $C_6H_4$—p-$OOCCH_3$ |
| 6 | 4-$OOCCH_3$ | $CH_3$ | 4-$CH_3$ | 6-$OCH_2CH_2SO_4K$ | H | $C_6H_{10}$—4-$CH_3$ |
| 6 | 4-$NHCOCH_3$ | $CH_3$ | 4-$OCH_3$ | 6-$CH_3$ | H | $CH_2CH_2(C_4H_4O_2N)$ |
| 4,6 | 4-NHCOPh | $CH_3$ | 5-Ph | 6-Ph | $CH_3$ | $CH_2CH_2NO_2$ |
| 4 | 4-$C_2H_5$ | $CH_3$ | H | 6-$NO_2$ | $CH_3$ | $C_6H_4$—p-$NO_2$ |
| 6 | 4-Ph | $CH_3$ | H | 6-$OCH_3$ | $CH_3$ | $CH_2NHOCCH_3$ |
| 4 | 4-$OSO_3K$ | H | H | H | H | $CH_2CH_2SO_3K$ |
| 4 | 2,5-di-Cl | H | 5-$SO_3Na$ | 6-$NHCOCH_3$ | $C_2H_5$ | $CH_2NHSO_2CH_3$ |
| 4 | 2-Cl—4-$SO_2CH_3$ | H | 5-$SO_3Na$ | 6-$NHSO_2CH_3$ | $CH_3$ | $C_6NHSO_2CH_3$ |
| 4 | 4-$NHSO_2CH_3$ | H | 6-$OCH_2CH_2SO_4K$ | 6-$COOCH_3$ | $CH_3$ | $C_6H_4$—p-$NHSO_2CH_3$ |
| 4 | 4-$COOCH_3$ | H | 6-$OCH_2CH_2SO_4K$ | 6-COOH | H | $C_6H_{10}$—4-$NHOCCH_3$ |
| 4 | 2-$OCH_3$ | $C_2H_5$ | 5-NHCOPh | 6-Cl | $CH_3$ | $CH_2CH_2Cl$ |
| 5 | 4-$OC_2H_5$ | $C_2H_5$ | 4-NHCOPh | 5,6-di-Br | $C_2H_5$ | $C_6H_4$—p-Br |
| 6 | 4-$SO_3Na$ | $C_2H_5$ | 4-$NHCOCH_3$ | 5,6-di-Br | H | $C_6H_4$—p-CN |
| 6 | 2-$SO_3Na$ | $C_2H_5$ | 4-$OOCC_2H_5$ | 5-$OCH_3$—6-$NHCOCH_3$ | H | $CH_2CH_2CN$ |
| 4 | 2-$OCH_3$—4-$SO_3K$ | H | 5-COOH | 6-$CH_2OOCCH_3$ | H | $CH_2CH_2OC_2H_5$ |
| 6 | 4-$OCH_2CH_2OSO_3K$ | H | H | 6-$CH_2Cl$ | H | $CH_2CH_2OCH_2CH_2OC_2H_5$ |
| 4,6 | 2-$SO_3Na$—5-Cl | H | H | 6-CN | H | $CH_2Ph$ |
| 6 | 4-Cl | H | 4-$SO_2CH_3$ | 6-$OOCCH_3$ | $CH_3$ | $CH_2C_6H_{11}$ |
| 4 | 4-OH | H | 6-$CF_3$ | 5-COOH | $CH_3$ | $C_6H_4$—o-OH |
| 4 | 4-$CH_2OOCCH_3$ | $C_3H_7$—n | 6-$COOCH_3$ | 5-OH | $CH_3$ | $CH_2CH_2OH$ |
| 4 | 4-$SO_3K$ | $C_3H_7$—n | 6-CHO | 5-$CH_2CH=CH_2$ | $C_2H_5$ | $CH_2CH_2$—$SO_3K$ |
| 4 | 4-OPh | H | 6-$CONH_2$ | 6-$CH_3$ | $CH_3$ | $C_6H_4$—p-$OSO_3K$ |
| 4 | 4-$NO_2$ | H | 6-$CONHCH_3$ | 6-$COCH_3$ | $CH_3$ | $CH_2OPh$ |
| 4 | 5-CN | H | 6-$CH_2Ph$ | 6-$OCH_3$ | H | $CH_2SO_2NHPh$ |
| 4 | 4-$COCH_3$ | H | 6-$CH_2SO_3K$ | 6-$SO_3Na$ | $CH_3$ | $CH_2SO_2NHCH_3$ |
| 4 | 5-$CH_3$ | H | 6-$CH_2OSO_3K$ | 6-$OCH_2CH_2SO_4K$ | H | $C_6H_4$—p-$SO_2NHCH_3$ |
| 4 | 5-Ph | H | 5-$C_6H_4$—p-$SO_3K$ | 6-$OCH_2CH_2SO_3K$ | $CH_3$ | $CH_2COOCH_3$ |
| 4 | 5-$OCH_3$ | H | 5-$CH_2CH_2OH$ | 6-$CH_3$ | H | $CH_2SO_2N(CH_3)_2$ |
| 4 | 4,5-di-Br | H | 5-$CH_2Cl$ | 6-Ph | H | $C_6H_4$—p-$NHCOOCH_3$ |
| 4 | 5-COOH | $C_4H_9$—n | 6-$C_6H_4$—p-Br | 6-$NO_2$ | $C_2H_5$ | $CH_2CH_2CONH_2$ |
| 4 | H | H | H | 6-$OCH_3$ | $C_2H_5$ | $C_6H_4$—p-$CONHCH_3$ |
| 4 | 4-$NO_2$ | H | 6-$COCH_3$ | 6-$NHCOCH_3$ | $CH_3$ | $C_6H_4$—p-$SCH_3$ |
| 4 | 4-CN | H | 6-$NO_2$ | 6-$NHSO_2CH_3$ | $C_3H_7$—n | $CH_2CH_2SCH_3$ |
| 4 | 5-$COCH_3$ | H | 6-Cl | 6-$COOCH_3$ | H | $CH_2$—$C_6H_4$—p-$SCH_3$ |
| 4 | 4-COPh | $CH_3$ | 5-CN | 6-COOH | $CH_3$ | $CH_2SO_2C_2H_5$ |
| 4 | 2,4-di-COOH | $CH_3$ | 5-$NHSO_2CH_3$ | 8-Cl | H | $CH_2SO_2Ph$ |
| 4 | 4-$OOCCH_3$ | $CH_3$ | 5-$CH_3$ | 5,6-di-Br | H | $CH_2CH_2OSO_3K$ |
| 4 | 4-$NHCOCH_3$ | $CH_3$ | 5-$OCH_3$ | 5,6-Di-Br | H | $C_6H_4$—p-$OSO_3K$ |
| 4 | 4-NHCOPh | $CH_3$ | 6-Ph | 5-$OCH_3$—6-$NHCOCH_3$ | H | $CH_2(C_8H_4O_2N)$ |
| 5 | 4-$CH_2CH=CH_2$ | H | H | 6-$NHCOCH_3$ | $C_2H_5$ | $C_2H_5$ |
| 4,6 | H | $CH_3$ | H | 6-OCPh | $C_2H_5$ | $C_2H_5$ |
| 6 | 4-$CONH_2$ | H | H | 6-$CH_2CONHCH_3$ | H | H |
| 6 | 3-$SO_2NH_2$ | H | 4-$COCH_3$ | 6-$CH_2CON(CH_3)_2$ | $CH_3$ | Ph |
| 4 | 4-$SO_2NHCH_3$ | H | 5-$NO_2$ | 6-$CH_2CH_2OCH_2CH_2OC_2H_5$ | $C_2H_5$ | $C_6H_{11}$ |
| 4 | 4-$SO_2N(C_2H_5)_2$ | H | 6-Cl | 6-$CH_2SC_2H_5$ | H | CH—CH=$CH_2$ |
| 4 | 4-$SO_3C_6H_5$ | $CH_3$ | 6-CN | 6-$CH_2SC_6H_5$ | H | $CH_2OOCC_2H_5$ |
| 5 | 4-$SCH_3$ | $CH_3$ | 4-$NHSO_2CH_3$ | 6-$CH_2SO_2C_2H_5$ | H | $C_6H_{10}$—p-$OOCCH_3$ |
| 6 | 2,4-di-SCN | $CH_3$ | 4-$CH_3$ | 6-$CH_2SO_2C_6H_5$ | H | $C_6H_{10}$—4-$CH_3$ |
| 4 | 4-$SO_2C_6H_5$ | $CH_3$ | 6-$OCH_3$ | 6-$C_6H_3$—o,p-di-CN | H | $CH_2CH_2$—$(C_4H_4O_2N)$ |
| 4 | 2-CHO—4-CN | $CH_3$ | 6-Ph | 6-$C_6H_2$—o,m,p-tri-Cl | $CH_3$ | $CH_2CH_2NO_2$ |
| 4 | 4-$CONHC_2H_5$ | $CH_3$ | H | 6,8-di-$OSO_3NH(CH_3)_3$ | $CH_3$ | $C_6H_4$—p-$NO_2$ |
| 4 | 4-$CON(C_2H_5)_2$ | H | H | 5,6-di-$OSO_3Na$ | $CH_3$ | $CH_2NHOCCH_3$ |
| 4 | 3-$C_6H_{11}$ | H | 5,6-di-$SO_3Na$ | 5,6-di-$OSO_3Na$ | $C_2H_5$ | $CH_2NHSO_2CH_3$ |
| 4 | 3-$SC_6H_5$ | H | 6-$SO_3Na$ | 5,6-di-$SO_3NH(CH_3)_3$ | $CH_3$ | $C_6H_4$—p-$NHOCCH_3$ |
| 4 | 3-$SC_6H_5$ | H | 6-$SO_3Na$ | 5,6-di-$SO_3NH(CH_3)_3$ | $CH_3$ | $C_6H_4$—p-$NHOCCH_3$ |
| 4 | 4-$NHSO_2C_6H_5$ | H | 6-$OCH_2CH_2SO_4K$ | 5,6-di-$OSO_3Na$ | $CH_3$ | $C_6H_4$—p-$NHSO_2CH_3$ |
| 4 | 4-$SC_6H_{11}$ | H | 5-$OCH_2CH_2SO_4K$ | 6-$SC_6H_{11}$ | H | $C_6H_{10}$—4-$NHOCCH_3$ |
| 4 | 4-$C_6H_4$—p-$CH_3$ | $C_2H_5$ | 6-$NHCOPh$ | 6-$C_6H_4$—p-$CH_3$ | $CH_3$ | $CH_2CH_3Cl$ |
| 5 | 4-$C_6H_4$—p-$CH_2CH=CH_2$ | $C_2H_5$ | 4-NHCOPh | 6-$C_6H_4$—p-$CH_2CH=CH_2$ | $C_2H_5$ | $C_6H_4$—p-Br |
| 6 | 4-$OCH_2CH_2NO_2$ | $C_2H_5$ | 4-$NHCOCH_3$ | 6-$OCH_2CH_2NO_2$ | H | $C_6H_4$—p-CN |
| 4 | 2-$CH_2NHCOCH_3$ | $C_2H_5$ | 6-$OOCC_2H_5$ | 6-$CH_2NHCOCH_3$ | H | $CH_2CH_2CN$ |

TABLE 3-continued

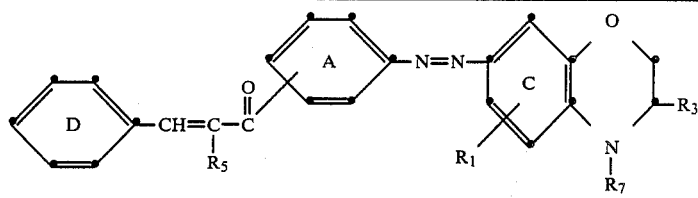

| Cinnamoyl Group Position | R₁ on D | R₅ | Substituents on A | R₁ on C | R₃ | R₇ |
|---|---|---|---|---|---|---|
| 4 | 4-CH₂NHSO₂C₂H₅ | H | 6-COOH | 6-CH₂NHSO₂C₂H₅ | H | CH₂CH₂OC₂H₅ |
| 4 | 4-CH₂CH₂Cl | H | H | 6-CH₂CH₂Cl | H | CH₂CH₂OCH₂CH₂OC₂H₅ |
| 4,6 | 2,6-di-CH₂CN | H | H | 5,6-di-CH₂CN | H | CH₂Ph |
| 6 | 4-CH₂CH₂OC₂H₅ | H | 4-SO₂CH₃ | 6-CH₂CH₂OC₂H₅ | CH₃ | CH₂C₆H₁₁ |
| 6 | 4-CH₂C₆H₅ | H | 4-CH₂C₆H₅ | 6-COOH | CH₃ | C₆H₄—o-OH |
| 4 | 4-CH₂C₆H₁₁ | C₃H₇—n | 6-COOCH₃ | 6-CH₂C₆H₁₁ | CH₃ | CH₂CH₂OH |
| 4 | 4-CH₂CH(OH)CH₂OH | C₃H₇—n | 6-CHO | 6-CH₂CH(OH)CH₂OH | C₂H₅ | CH₂CH₂—SO₃K |
| 4 | 4-CH₂CH₂—SO₃K | H | 5-CONH₂ | 6-CH₂CH₂—SO₃K | CH₃ | C₆H₄—p-OSO₃K |
| 4 | 4-CH₂OC₆H₅ | H | 5-CONHCH₃ | 6-CH₂OC₆H₅ | CH₃ | CH₂OPh |
| 4 | 4-CH₂OOCC₆H₅ | H | 5-CH₂Ph | 6-CH₂OOCC₆H₅ | H | CH₂SO₂NHPh |
| 4 | 5-CH₂COOCH₃ | H | 6-CH₂SO₃K | 5-CH₂COOCH₃ | CH₃ | CH₂SO₂NHCH₃ |
| 4 | 4-C₆H₄—p-SO₂N(C₂H₅)₂ | H | 6-CH₂OSO₃K | 6-C₆H₄—p-SO₂N(C₂H₅)₂ | H | C₆H₄—p-SO₂NHCH₃ |
| 4 | 4-CH₂CH₂NHCOOCH₃ | H | 6-C₆H₄—p-SO₃K | 6-CH₂CH₂NHCOOCH₃ | H | CH₂COOCH₃ |
| 4 | 4-CH₂NHCONHCH₃ | H | 6-CH₂CH₂OH | 6-CH₂NHCONHCH₃ | H | CH₂SO₂N(CH₃)₂ |
| 4 | 4-CH₂CONH₂ | H | 6-CH₂Cl | 6-CH₂CONH₂ | H | C₆H₄—p-NHCOOCH₃ |
| 4 | 5-CH₂CONHCH₃ | C₄H₉—n | 6-C₆H₄—p-Br | 6-CONH₂ | C₂H₅ | CH₂CH₂CONH₂ |
| 4 | 4-CH₂CON(CH₃)₂ | H | H | 6-SO₂NH₂ | C₂H₅ | C₆H₄—p-CONHCH₃ |
| 4 | 4-CH₂CH₂OCH₂CH₂OC₂H₅ | H | 5-COCH₃ | 6-SO₂NHCH₃ | CH₃ | C₆H₄—p-SCH₃ |
| 4 | 4-CH₂SC₂H₅ | H | 5-NO₂ | 6-SO₂N(C₂H₅)₂ | C₃H₇—n | C₂CH₂SCH₃ |
| 4 | 5-CH₂SC₆H₅ | H | 5-Cl | 6-SO₃C₆H₅ | H | CH₂—C₆H₄—p-SCH₃ |
| 4 | 4-CH₂SO₂C₂H₅ | CH₃ | 5-CN | 6-SC₆H₅ | CH₃ | CH₂SO₂C₂H₅ |
| 4,5 | 2,4-di-CH₂SO₂C₆H₅ | CH₃ | 6-NHSO₂CH₃ | 5,6-di-SCN | H | CH₂SO₂Ph |
| 6 | 4-C₆H₃—o,p-di-CN | CH₃ | 4-CH₃ | 6-SO₂C₆H₅ | H | CH₂CH₂OSO₃K |
| 4 | 4-C₆H₂—o,m,p-tri-Cl | CH₃ | 5-OCH₃ | 5-CHO-6-CN | H | C₆H₄—(C₈H₄O₂N) |
| 4 | H | H | 6-CH₂(C₄H₄O₂N) | 6-CON(C₂H₅)₂ | H | C₂H₅ |
| 4 | H | H | 6-CH₂(C₄H₃O) | 6-C₆H₁₁ | H | C₂H₅ |
| 4 | 5-CH₂(C₈H₄O₂N) | H | H | 6-SC₆H₅ | H | C₂H₅ |
| 4 | 5-CH₂(C₄H₃O) | H | H | 6-NHSO₂C₆H₅ | H | C₂H₅ |

The invention has been described in detail with particular reference to preferred embodiments thereof, but it will be understood that variations and modifications can be effected within the spirit and scope of the invention.

I claim:

1. A dye having the structure:

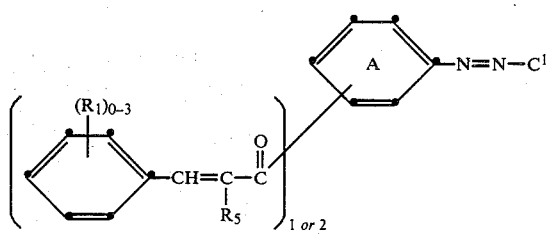

wherein the A ring is unsubstituted or substituted in any positions not occupied by cinnamoyl groups; $R_5$ is H or alkyl; and each $R_1$ and each A ring substituent is selected from alkyl, alkenyl or 2-6 carbon atoms, aryl, cyclohexyl, alkoxy, halogen, hydroxy, alkylsulfonyl, cyano, carbamoyl, alkanoyl, alkanoyloxy, aroyl, alkoxycarbonyl, sulfamoyl, alkylsulfamoyl, dialkylsulfamoyl, alkanoylamino, $SO_3C_6H_5$, amino, alkylthio, thiocyano, arylsulfonyl, formyl, alkylcarbamoyl, dialkylcarbamoyl, $NO_2$, —$SO_3M$, —$OSO_3M$, —COOH, aryloxy, arylthio, alkylsulfonylamino, aroylamino, arylsulfonylamino, and cyclohexylthio, wherein each of the alkyl, alkenyl, aryl, and cyclohexyl moieties of the above groups, is unsubstituted or substituted with 1-3 substituents different from the said moiety and independently selected from alkanoyloxy, alkyl, alkenyl, succinimido, —$NO_2$, alkanoylamino, alkylsulfonylamino, 1-(2-pyrrolidono), halogen, cyano, alkoxy, aryl, cyclohexyl, hydroxy, —$SO_3M$, —$OSO_3M$, aryloxy, furyl, aroyloxy, alkoxycarbonyl, —$SO_2N$-(alkyl)₂, —NH-COO-alkyl, —NHCONH-alkyl, glutarimido, phthalimido, $CONH_2$, CONH-alkyl, CON(alkyl)₂, alkoxyalkoxy, alkylthio, arylthio, alkylsulfonyl, and arylsulfonyl, wherein M is selected from $H^+$, $NH_4^+$, $Na^+$, $K^+$, and the colorless cations of sulfuric or sulfonic acid salts of trimethylamine, triethylamine, tri(2-hydroxyethyl)amine, di(2-hydroxyethyl)amine, or N,N-dimethylaniline; and the coupler $C^1$ is selected from

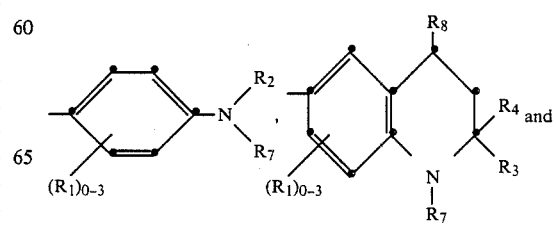

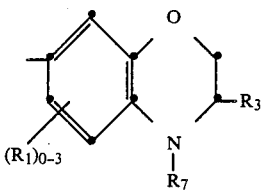

wherein each $R_1$ is as defined above; $R_2$ and $R_7$ are each selected independently from hydrogen, alkyl, alkenyl of 2-6 carbon atoms, aryl, and cyclohexyl, all of which groups are unsubstituted or substituted as defined above for the substituted $R_1$ groups; and $R_3$, $R_4$ and $R_8$ are each selected from hydrogen and alkyl.

2. A dye of claim 1 wherein the coupler $C^1$ is

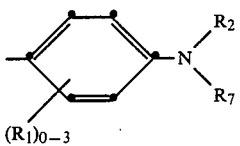

wherein $R_1$, $R_2$, and $R_7$ are as defined therein.

3. A dye of claim 1 wherein the coupler $C^1$ is

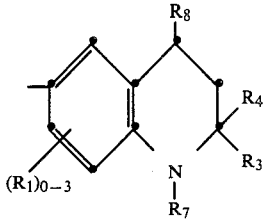

wherein $R_1$, $R_3$, $R_4$, $R_7$, and $R_8$ are as defined therein.

4. A dye of claim 1 wherein the coupler $C^1$ is

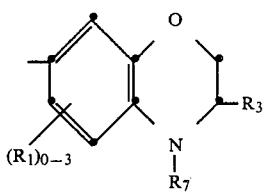

wherein $R_1$, $R_3$, and $R_7$ are as defined therein.

5. A dye according to claim 1 wherein: the A ring is unsubstituted or substituted with 1-3 substituents independently selected from methoxycarbonyl, β-hydroxyethylcarbamoyl, $CF_3$, $NO_2$, alkanoyl, alkylsulfonyl, alkoxy, β-potassiosulfatoethylcarbamoyl, halogen, CN, methylcarbamoyl, carbamoyl, ethoxycarbonyl, and methyl; the cinnamoyl ring is unsubstituted or substituted with 1-3 substituents independently selected from alkyl, aralkyl, aralkyl substituted with —$SO_3M$ or —$SO_4M$, cyclohexylalkyl, cyclohexylalkyl substituted with —$SO_3M$ or —$SO_4M$, alkoxy, and alkanoylamino; $R_2$ is H, alkyl, aralkyl, alkyl or aralkyl substituted with —$SO_3M$ or —$SO_4M$, cyclohexylalkyl, cyclohexylalkyl substituted with —$SO_3M$ or —$SO_4M$; $R_7$ is H, alkyl, aralkyl, aralkyl substituted with —$SO_3M$ or —$SO_4M$, cyclohexylalkyl, cyclohexylalkyl substituted with —$SO_3M$ or —$SO_4M$, sodio- or potassiosulfatoalkyl, sodio- or potassiosulfonicalkyl, or alkanoyloxyalkyl; the couplers are unsubstituted or substituted with 1-3 substituents independently selected from aralkyl, aralkyl substituted with —$SO_3M$ or —$SO_4M$, cyclohexylalkyl, cyclohexylalkyl substituted with —$SO_3M$ or —$SO_4M$, —$SO_3Na$, —$SO_3K$, —$SO_3N^+H(CH_3)_3$, halogen, —$SO_4Na$, —$SO_4K$, —$SO_4N^+H(CH_3)_3$, alkyl, alkoxy, —COOH, and —OH; $R_3$, $R_4$ and $R_8$ are H or alkyl; and $R_5$ is hydrogen.

6. A dye according to claim 1 wherein: the cinnamoyl ring is unsubstituted or substituted with halogen, COOH, OH, or $SO_3M$; ring A is unsubstituted or substituted with alkyl, halogen, CN, alkoxy, COOalkyl, $CONH_2$; alkanoylamino, CONHalkylene—$SO_4M$, hydroxyethylcarbamoyl, or CONHalkyl; and wherein, in an aniline coupler each substituent $R_1$ is a methyl, methoxy or acetamido group or a chlorine atom, each $R_2$ is hydrogen, a methyl or ethyl group, or a sulfonated cyclohexyl or benzyl group and each $R_7$ an ethyl or sulfonated ethyl group or an alkyl group of up to 4 carbon atoms substituted with a sulfonated phenyl group, each sulfonate group being of formula —$SO_3M$, and wherein in a tetrahydroquinoline coupler $R^1$ and $R^3$ are methyl groups, each of $R_4$ and $R_8$ is hydrogen or a methyl group, and $R_7$ is an ethyl group or a group of formula $CH_2CH_2OCOCH_3$ or $CH_2CH_2OSO_3M$.

7. A dye according to claim 1 wherein the coupler $C^1$ is selected from those of the formula

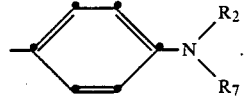

wherein $R_2$ is alkyl, $R_7$ is H, alkyl or alkyl substituted with $OSO_3M$ or $SO_3M$, and the phenyl ring is substituted with 1 or 2 groups independently selected from alkyl, alkoxy and alkanoylamino.

8. A dye according to claim 1 wherein ring A is unsubstituted or substituted with 1 or 2 substituents independently selected from cyano, halogen, alkyl, alkoxy and acylamido.

9. A dye according to claim 1 having the formula

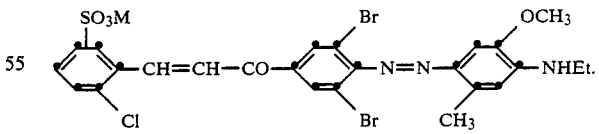

10. A dye according to claim 1 having the formula

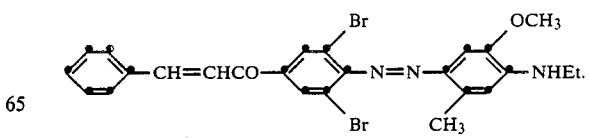

11. A dye according to claim 1 having the formula

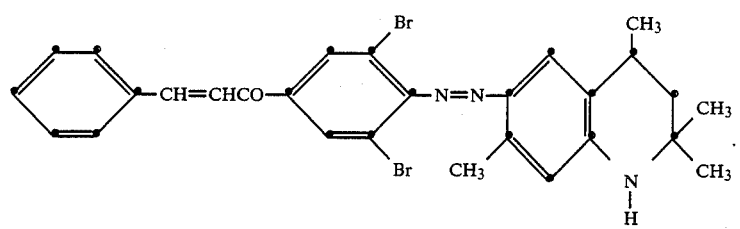
* * * * *